United States Patent [19]
Wang

[11] Patent Number: 5,276,556
[45] Date of Patent: Jan. 4, 1994

[54] COLOR SEPARATION SYSTEM FOR A COLOR SCANNER

[75] Inventor: Howard Wang, Taipei, Taiwan

[73] Assignee: Silitek Corporation, Taipei, Taiwan

[21] Appl. No.: 997,465

[22] Filed: Dec. 28, 1992

[51] Int. Cl.⁵ .............................................. G02B 5/22
[52] U.S. Cl. ..................................... 359/889; 359/892
[58] Field of Search ............... 359/885, 889, 890, 891, 359/892

[56] References Cited

U.S. PATENT DOCUMENTS

| | | | |
|---|---|---|---|
| 4,030,833 | 6/1977 | Barbieri | 359/889 |
| 4,528,685 | 7/1985 | Kump et al. | 359/889 |
| 4,746,955 | 5/1988 | Slayton et al. | 359/889 |
| 4,754,297 | 6/1988 | Edwards | 359/889 |
| 4,843,431 | 6/1989 | Horiguchi et al. | 359/889 |
| 4,974,937 | 12/1990 | Haigo et al. | 359/889 |
| 5,122,911 | 6/1992 | Kuo | 359/891 |
| 5,161,069 | 11/1992 | Jowang | 359/889 |

*Primary Examiner*—Loha Ben
*Attorney, Agent, or Firm*—Lowe, Price, LeBlanc & Becker

[57] ABSTRACT

A color separation system is disclosed consisted of a mounting frame, a color filter assembly, and a step motor controlled to move the color filter assembly back and forth in a channel. The color filter assembly is consisted of a filter holder frame, a cover frame fastened to the filter holder frame through doweled joints, a series of color filter lenses retained in windows between the filter holder frame and the cover frame, a rack meshed with a gear on the output shaft of the step motor, and top and bottom projecting rods respectively inserted in top and bottom guide slots on the mounting frame.

3 Claims, 6 Drawing Sheets

COLOR SEPARATION SYSTEM FOR A COLOR SCANNER

BACKGROUND OF THE INVENTION

The present invention relates to color separation systems, and more particularly to a color separation system which makes true color possible, improves the speed of scanning, and minimizes the size of a color scanner.

A variety of color separation systems have been proposed and widely used in a variety of optical systems, in particular color scanners, FIG. 1 illustrates a structure of color separation system according to the prior art which comprises a sector-like filter disc driven by a step motor to rotate alternatively back and forth on a post. The sector-like filter disc comprises spaced color filter lenses along the periphery, and an internal gear meshed with a driving gear coupled to the output shaft of the step motor. The sector-like filter disk is rotated back and forth on a post as the step motor was started. This structure of color separation system requires much installation space. Further, because the color filter lenses are not moved along a straight line, deflection torsion may occur.

FIG. 2 illustrates another structure of color separation system according to the prior art which uses a step motor to rotate an endless belt on two belt rollers in either direction, and therefore the color filter assembly is reciprocated along a rail for letting different color filter lenses to pass through a light source (not shown) alternatively. This structure of color separation system can not ensure high quality of image because the endless belt vibrates as it is rotated.

SUMMARY OF THE INVENTION

The present invention eliminates the aforesaid disadvantages. It is therefore an object of the present invention to provide a color separation system which provides a scanning system with high quality document image. It is another object of the present invention to provide a color separation system which requires less installation space. It is still another object of the present invention to provide a color separation system which is easy to assemble and inexpensive to manufacture.

According to the preferred embodiment, the color separation system is generally comprised of a mounting frame, a color filter assembly, and a step motor. The mounting frame is made from a channel plate having two elongated guide slots at different levels. The color filter assembly is consisted of a filter holder frame, a cover frame fastened to the filter holder frame through doweled joints, a series of color filter lenses retained in windows between the filter holder frame and the cover frame, a rack meshed with a gear on the output shaft of the step motor, and top and bottom projecting rods respectively inserted in the guide slots on the mounting frame. Rotating the step motor causes the gear to move the color filter assembly alternatively back and forth along the guide is slots. Because the filter assembly is guided along the guide slots on the mounting frame, no vibration is produced during the operation of the color separation system, and therefore high quality document image can be obtained. Because the filter holder frame and the cover frame are connected together through doweled joints, the assembly process of the color filter assembly is easy.

DETAILED DESCRIPTION OF THE PREFERRED EMBODIMENT

Figure 1:
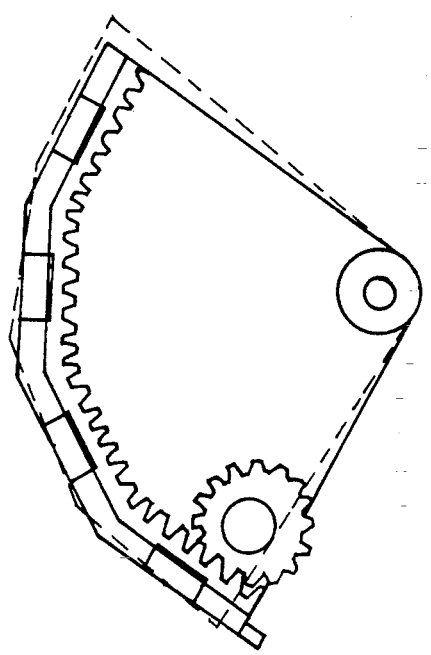
FIG. 1 illustrates a prior art color separation system.
Figure 2:
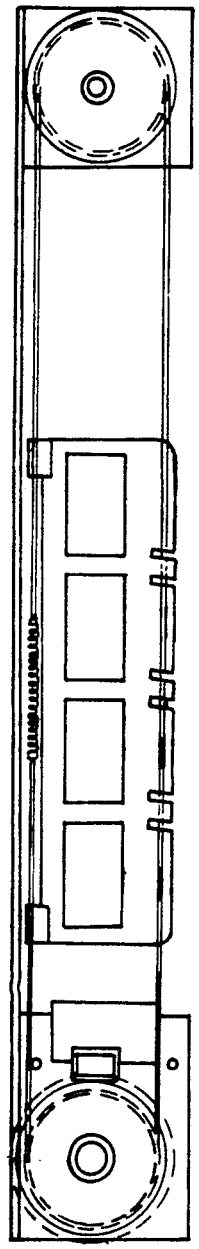
FIG. 2 illustrates another prior art color separation system.
Figures 3A, 3B:
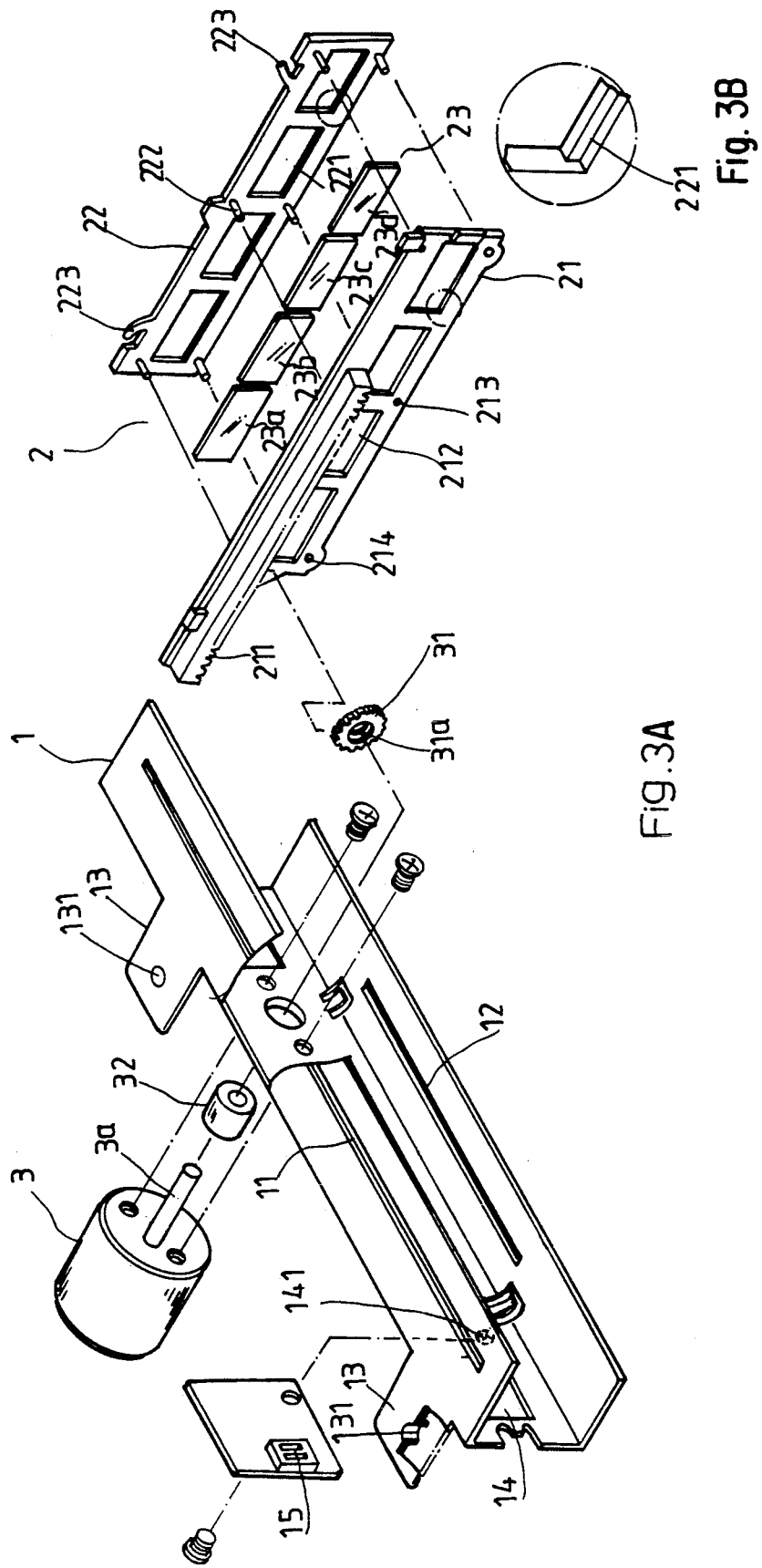
FIG. 3A is an exploded view of a color separation system according to the present invention.
FIG. 3B is a corner portion of a window of a cover frame of a color filter assembly of the color separation system of FIG. 3A.
Figure 4:
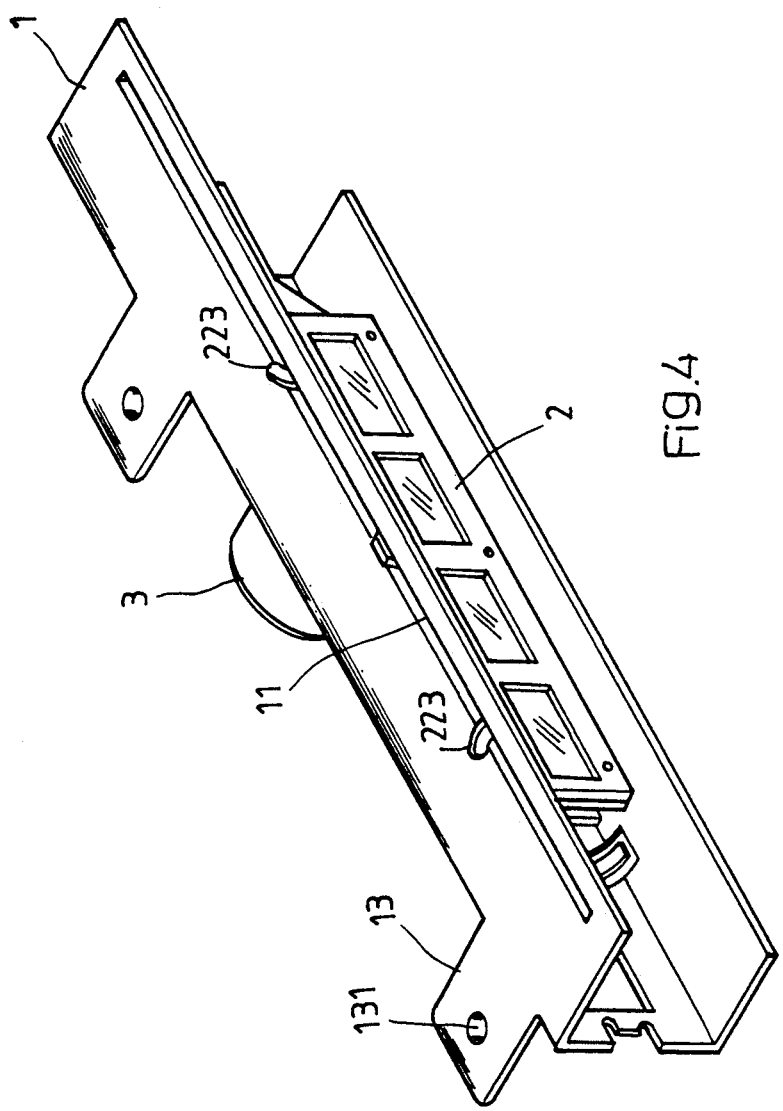
FIG. 4 is an elevational view of the color separation system of FIG. 3.

Referring to FIGS. 3A, 3B and 4, a color separation system in accordance with the present invention is generally comprised of a mounting frame 1, a color filter assembly 2, and a step motor 3.

The mounting frame I is made from a channel plate having two elongated guide slots 11,12 on two opposite side walls thereof in longitudinal direction, two spaced lugs 13 with holes 131 respectively extended backwards from one side wall and disposed perpendicular to the bottom wall thereof, and square holes 14 and through holes 141,142 on the bottom wall at suitable locations. An inductor 15 and the step motor 3 are respectively fastened to the through holes 141,142. The inductor 15 detects the position of the color filter assembly 2 and provides a corresponding signal to the control center for it to control the operation of the color filter assembly 2.

The color filter assembly 2 is consisted of a filter holder frame 21, a cover frame 22 fastened to the filter holder frame 21, and filter lenses 23 retained between the filter holder frame 21 and the cover frame 22. The cover frame 22 has pins 222 respectively fitted into holes 213 on the filter holder frame 21. The filter holder frame 21 has a series of windows 212 respectively aligned with windows 221 on the cover frame 22 for holding the filter lenses 23. The number of windows 212,221 is determined according to the number of the filter lenses 23. The filter lenses 23 include preferably a red color filter lens 23a, a green color filter lens 23b, a blue color filter lens 23c, and a white color filter lens (transparent lens) 23d. The color filter assembly 2 further comprises top projecting rods 223 and bottom projecting rods 214 respectively inserted through the guide slots 11,12 on the mounting frame 1, and a rack 211 meshed with a gear 31 driven by the step motor 3.

The step motor 3 has an output shaft 3a inserted through a bushing 32 on the mounting frame 1 and fitted into the center hole 31a of the gear 31. Therefore, rotating the step motor 3 in either direction causes the gear 31 to drive the rack 211 in moving the color filter assembly 2 in either direction along the guide slots 11,12.

Referring to FIG. 4 again, the step motor 3 is controlled, by means of the control instruction from a control program, to move the color filter assembly 2 leftwards along the the guide slots 11,12. As the color filter lens 23a,23b,23c or 23d passes through the inductor 15, the inductor 15 is induced to provide a corresponding signal to the control center (central processing unit) in driving the scanning mechanism to process a specific color scanning. The white color filter lens 23d is moved into position when a black and white document is to be scanned. For scanning a colored document, the red, green and blue color filter lens 23a,23b,23c are alternately moved into position in proper order.

Figure 5:
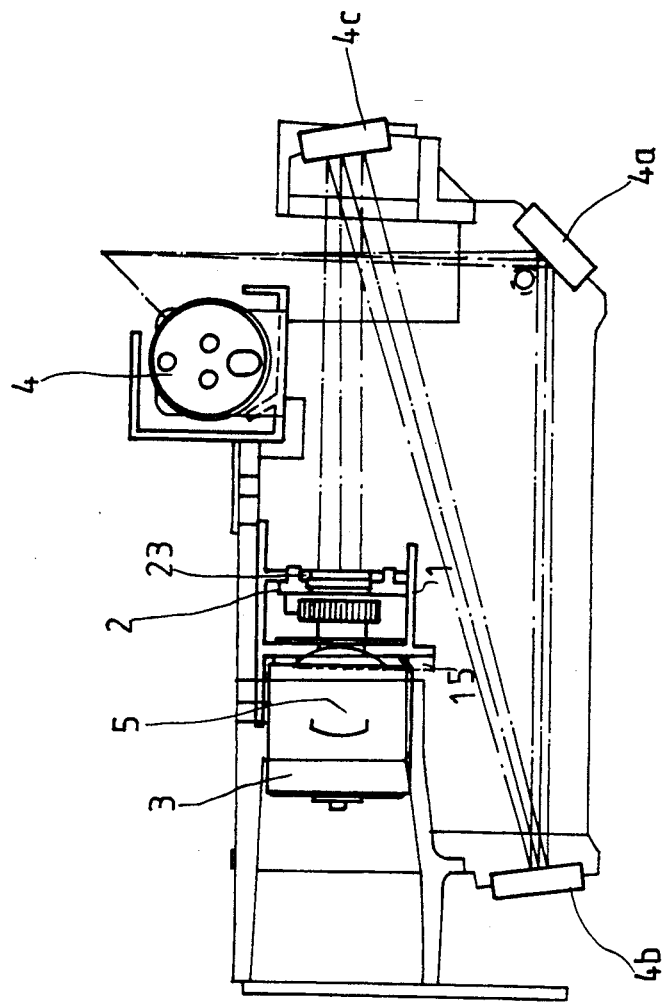
FIG. 5 illustrates the position of the present invention in a scanning system and its operation.
Figure 6:
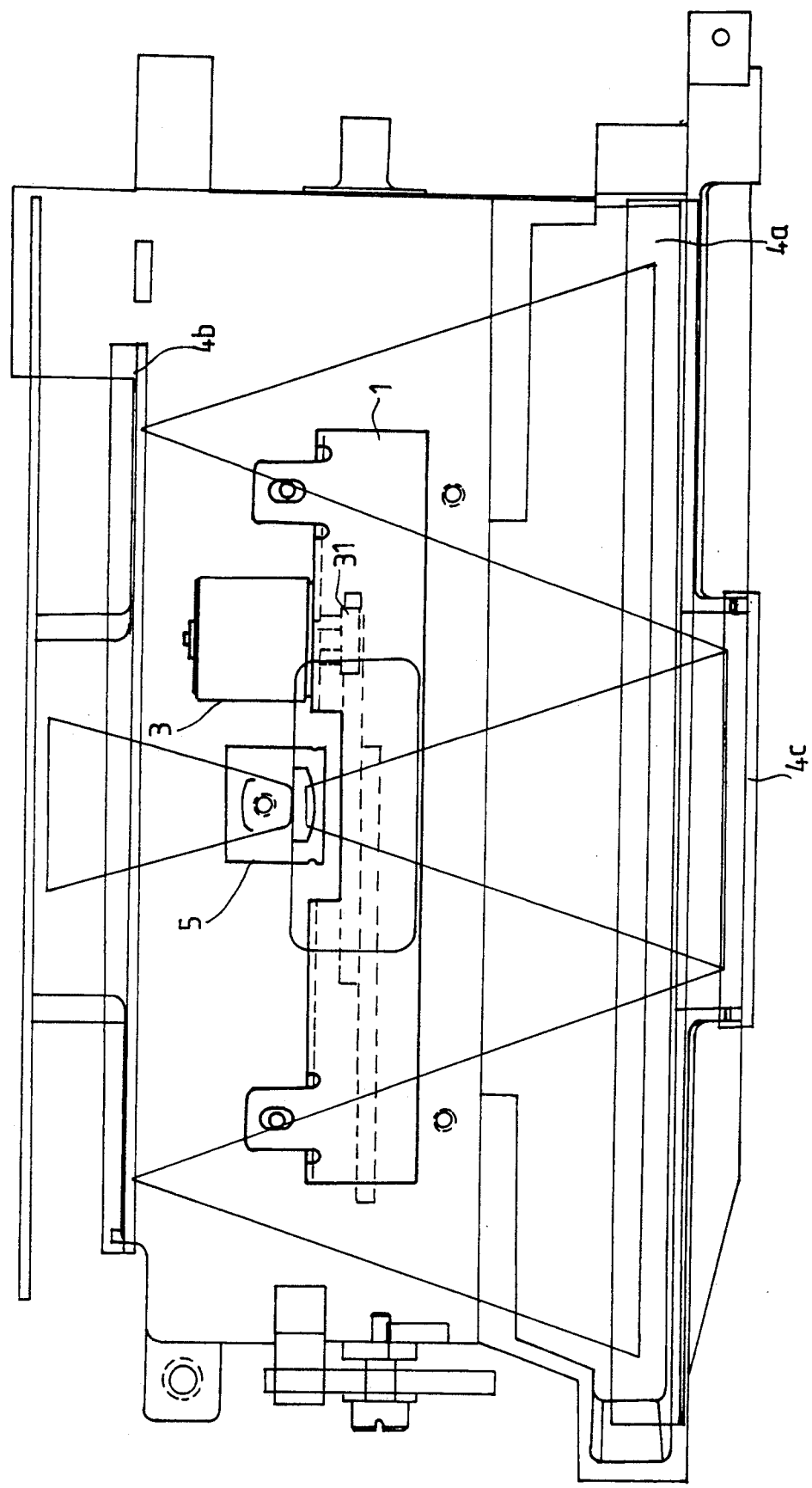
FIG. 6 is a plain view taken from FIG. 5 in different direction.

Referring to FIGS. 5 and 6, a light beam from a light source 4 is projected onto the document to be scanned, and the image of the document is then reflected through reflectors 4a,4b,4c and then imaged onto the color filter assembly 2 through a horizontal linear course. Then, the image of the document is collected by a focus lens 5 color by color, and then focused on a charge coupled element 15 in causing it to provide a corresponding output to the central processing unit through an interface circuit.

What is claimed is:

1. A color separation system comprising:
   a mounting frame made from a channel plate having two parallel horizontal walls jointed by a vertical wall, said mounting frame comprising two elongated guide slots respectively made on the parallel horizontal walls in longitudinal direction, two spaced lugs with holes respectively extended backwards from one of said parallel horizontal walls for mounting on a scanning system, two spaced square holes on the vertical wall at two opposite ends;
   an inductor fastened to said mounting frame and disposed behind one of said square holes;
   a color filter assembly movably fastened to said mounting frame and retained between said parallel horizontal walls, said color filter assembly consisted of a filter holder frame covered with a cover frame, and a series of filter lenses respectively retained in windows on said filter holder frame and said cover frame, said color filter assembly comprising top projecting rods and bottom projecting rods respectively inserted in said guide slots and a rack;
   a step motor having an output shaft inserted through a hole on said mounting frame and coupled with a driving gear meshed with said rack, and rotated to move said color filter assembly back and forth along said guide slots through said square holes on said vertical wall of said mounting frame for color separation.

2. The color separation system of claim 1 wherein said filter lenses are arranged in a line and moved to pass through said inductor.

3. The color separation system of claim 1 wherein said cover frame has pins respectively fitted into holes on said filter holder frame.

* * * * *